Feb. 25, 1964     E. E. LAMBRICH     3,121,897
HYDRAULICALLY OPERATED DISH WASHING MACHINE
Filed May 11, 1962     3 Sheets-Sheet 1
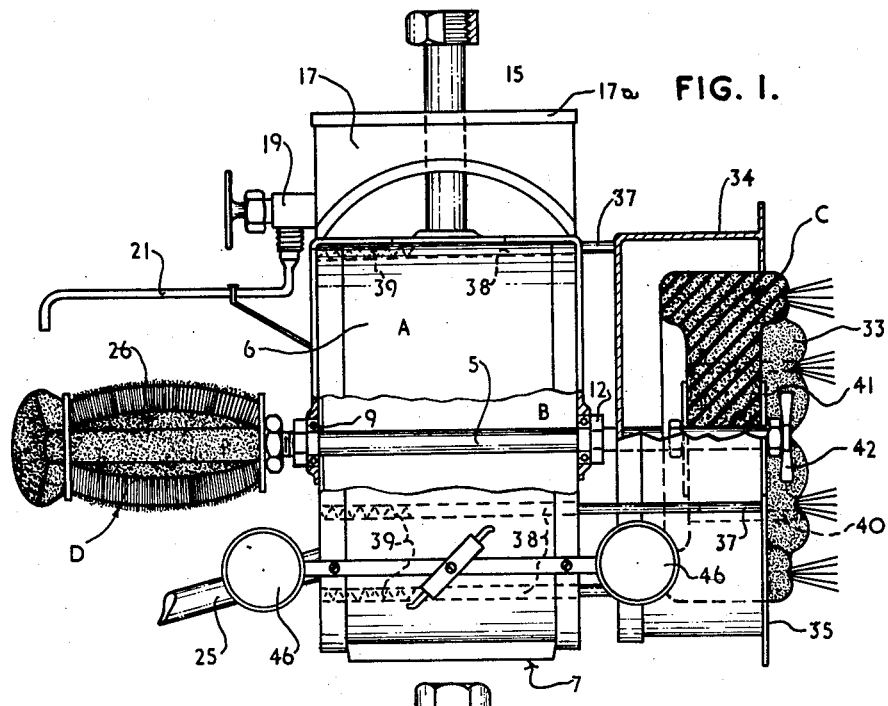
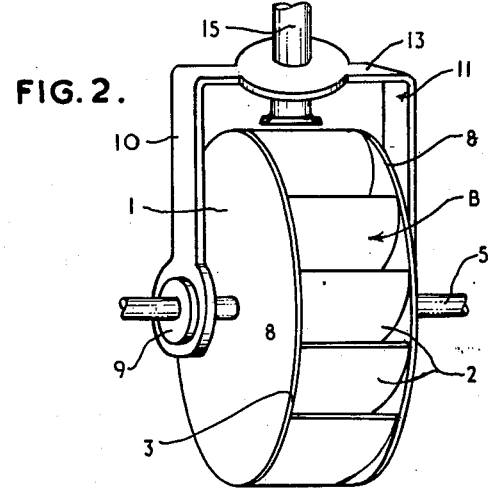
INVENTOR
ERICH E. LAMBRICH
ATTORNEY

INVENTOR
ERICH E. LAMBRICH

Feb. 25, 1964     E. E. LAMBRICH     3,121,897
HYDRAULICALLY OPERATED DISH WASHING MACHINE
Filed May 11, 1962     3 Sheets-Sheet 3
FIG. 5.
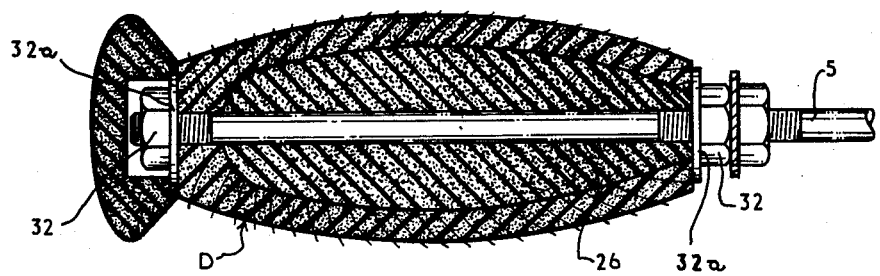
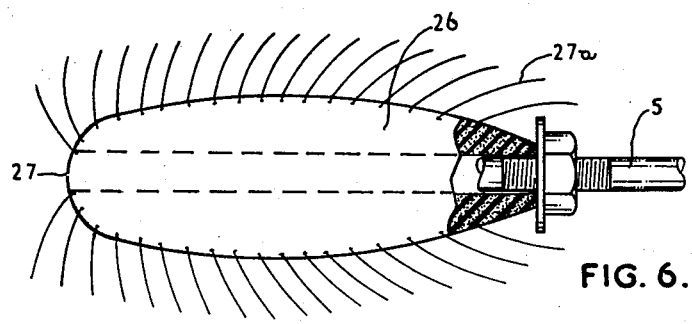
FIG. 6.
FIG. 7.
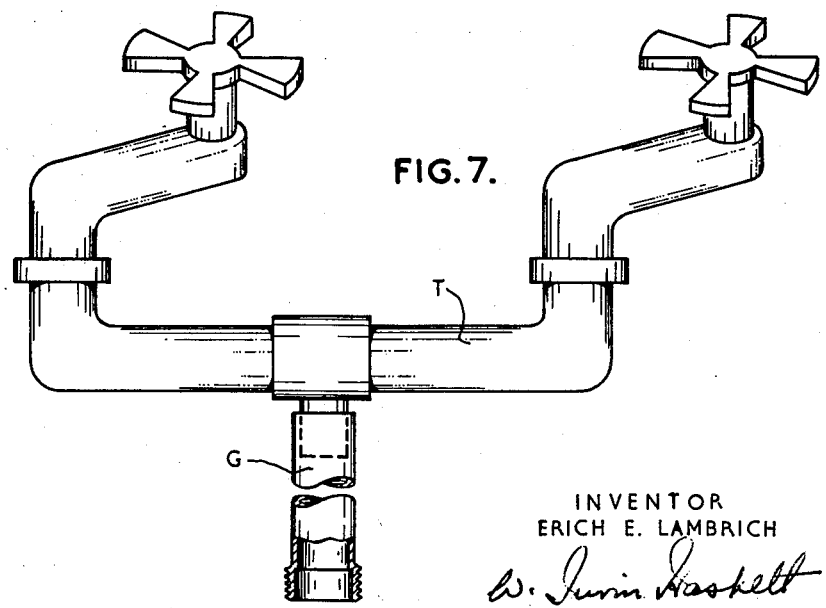
INVENTOR
ERICH E. LAMBRICH
ATTORNEY 3,121,897
HYDRAULICALLY OPERATED DISH WASHING
MACHINE
Erich E. Lambrich, 829 Edward St., Estevan,
Saskatchewan, Canada
Filed May 11, 1962, Ser. No. 194,111
3 Claims. (Cl. 15—74)

My invention relates to a dish washing machine although it is capable of many other uses, such as a knife sharpener, a vegetable cutter, and in other desired manner which arise in households or larger establishments.

I am aware that dish washing machines operated mechanically or by electrical power have been used, but these are generally installed in hotels, restaurants and other like establishments and moreover these machines are not portable in the sense that they may be readily carried from room to room or disconnected and stored in a minimum of space.

The dish washer in which I am interested is one which may be operated by the pressure of ordinary gravity supplied water, usually found in residential buildings, as a motive power for the dish washing machine, such machine being portable and capable of being mounted in a kitchen sink, and connected with the cold or hot water faucet of the sink, or it may be connected to both such faucets to provide water of the desired temperature which will not only operate the machine but will provide a desirable washing liquid for dishes and the like.

My dish washing machine can be readily disconnected from the water faucet and removed from the sink when not in use and stored in a minimum of space, so that the sink is available for purposes other than the washing of dishes.

My machine can be made in various sizes adaptable and capable of use in apartments, residential homes and other larger establishments.

One of the objects of my invention is to construct a dish washing machine which can be demountably mounted or attached within a kitchen sink in a position adjacent the cold and hot water faucets of the sink, the machine being readily removable when not in use.

Another object of my invention is to construct a washing machine with a central rotor and lateral cleaning media or units, driven by the rotor, and by-passing part of the propelling water from the rotor to or adjacent the cleaning media or units.

A further object of my invention is to provide my washing machine with a reservoir for liquid soaps or other detergents mixable with water, and to convey and deliver this soap or detergent to the cleaning media or units in a manner best calculated to insure maximum efficiency of the machine when in operation.

Still another object of my invention is to provide the machine with suction cups which adhere to the side walls of a kitchen sink and so retain or hold the washing machine at the desired level above the bottom of the sink.

A further object still of my invention is to utilize the water power which drives the machine to also wash the dishes, cups and glasses, and also to rinse flat washed dishes by simply cutting off the soap or detergent supply and permitting clean water to be delivered to the cleaning media or units during the rinsing operations.

Another object still of my invention is to arrange the several parts of the washing machine so that they are capable of instant inspection, adjustment and repair should this be found necessary.

Still a further object of my invention is to construct the washing machine of light and durable material, such as light metallic alloys, plastics etc., so that while the machine is light and easily handled, it is nevertheless strong and durable and not liable to go out of repair under ordinary normal useable circumstances.

Further objects of my invention will be made clear as the specification develops.

So that the nature of my invention will be clearly understood, I have illustrated an embodiment of the same which I shall describe in detail, but I wish it to be understood that I do not limit my invention to the specific form illustrated and described, but reserve the right to modify and rearrange the several parts within the scope of my appended claims, and without departing from the spirit of my invention.

In the drawings:

FIGURE 1 is a front elevation of my rotary dish washer;

FIGURE 2 is a semi-perspective vertical view showing the rotor housing or casing and showing the manner of supporting the rotor on the inverted U-shaped bracket or bail;

FIGURE 5 is a longitudinal section of the tumbler washing member;

FIGURE 6 is a detailed view showing the manner in which the bristles are mounted on the tumbler washing member; and FIGURE 7 is a perspective view of the connection of my cleaning device with both hot and cold faucets of a sink.

Like characters of reference refer to like parts in the several figures of the drawings.

Figure 3:
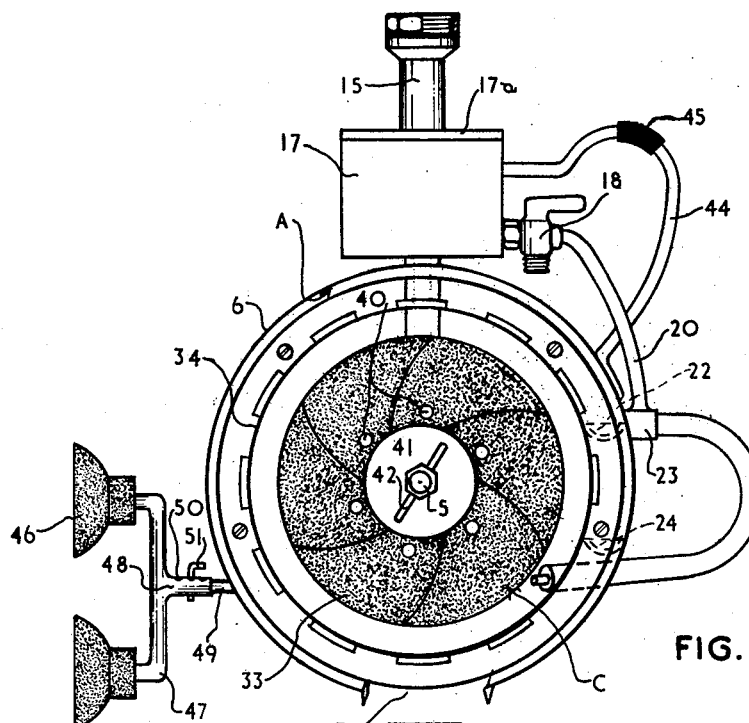
FIGURE 3 is an end view of the dish washer as seen when looking at the right hand side of FIGURE 1.

Referring to the drawings, A represents my dish washer comprising a rotor B and laterally disposed cleaning media or units C and D which are rotated by and in unison with the rotor B. The rotor B and the cleaning units C and D are all in axial alignment.

The rotor B is preferably made of heavy metal alloy such as copper, stainless steel, galvanized iron or other rust-free heavy metal alloy, which additionally gives the rotor the desired weight and consists of a central wheel 1 which in the embodiment illustrated is of disc formation, but it may be constructed of a boss supporting an encircling rim by means of spokes if such structure is found desirable.

The wheel 1 carries a plurality of buckets 2 equidistantly spaced around the periphery of the wheel and extending transversely across the periphery 3 of the wheel, and these buckets 2 are formed with an arcuate bottom wall, while the upper open mouth 4 of the buckets lie in planes which are radially disposed relatively to the central axis of the wheel 1. The outer or peripheral edges of the buckets 2 may be thickened or made slightly heavier than the remainder of the bucket as such a construction will add to the peripheral centrifugal force of the wheel 1 when in rotation.

The wheel 1 is rigidly secured by any suitable means to a transversely disposed tubular shaft or pipe 5, and the ends of the shaft or pipe extend beyond the casing or housing 6 which encloses the rotor B. This housing is provided on its lower peripheral wall with a discharge opening or port 7 which carries off spent water after discharge from the buckets 2 of the rotor, as will be explained hereafter.

The sides of the rotor, that is the sides of the wheel 1 and the ends of the buckets 2 are enclosed by thin metallic plates 8 which may be thickened or made slightly heavier at their peripheral edges and are secured to the buckets by soldering or other suitable means.

The portions of the tubular shaft or pipe 5 which project beyond the lateral walls of the housing 6 are journalled in roller bearings 9 mounted on the depending arms 10 of an inverted U-shaped supporting frame or bail 11, and the bearings are securely positioned on the shaft by lock nuts 12 so that lateral displacement or creeping of the bearings is eliminated.

One projecting end of the tubular shaft 5 is operatively connected to the cleaning media or unit C, while the other end of the shaft is connected to the cleaning media or unit D, and these two media or units are rotatable in unison with the rotor B.

The transverse arm 13 of the inverted U-shaped frame or bail 11 is attached by suitable means to the housing or casing 6, and through this transverse arm the inlet water pipe 15 extends, and the discharge end of the pipe is located adjacent the rotor.

The discharge end of the water pipe 15 is offset as shown at 16 and this end of the pipe is flattened to form a narrow outlet which is substantially tangentially disposed relatively to the outer edges of the buckets 2.

The end of the water inlet pipe 15 remote from the offset end is threaded and is designed to be directly connected by a flexible hose (not shown), with a water faucet with which a kitchen sink is usually equipped.

It will be understood that cold and hot water faucets may be connected by the transverse arms of a T connector G, shown in FIGURE 7, and the intermediate vertical arm of the T connector may in turn be connected to the inlet water pipe 15 by a flexible hose, so that either hot or cold water may be used to actuate my dish washer, or a mixture of hot and cold water could be used if such be found desirable.

Extending partially around the inner peripheral wall of the casing or housing 6 at a level above shaft 5 is an inclined trough 22 formed of metal or plastic, and the lower end of this trough terminates in a downward sloping pipe 23 which delivers water by gravity from the housing or casing to the cleaning unit C as hereafter explained.

Located above the transverse arm 13 of the U-shaped frame or bail 11, is a reservoir 17 designed to contain liquid soap or other suitable liquid detergent, and this reservoir encircles the lower portion of the inlet pipe 15. This reservoir is formed with a removable cover 17a to permit replenishing the reservoir with a saponaceous fluid and the reservoir is provided on adjacent lateral walls with outlet valves 18 and 19. The valve 18 is connected to the upper end of the conduit 20 which discharges a liquid detergent to the pipe 23 which delivers the soap mixture to the pipe 23 to intermingle with the water delivered to the pipe 23 from the trough 22 and thence to the brush of the unit C. The valve 19 is provided with a discharge conduit 21 which is located above and adjacent the cleaning media or unit D.

Figure 4:
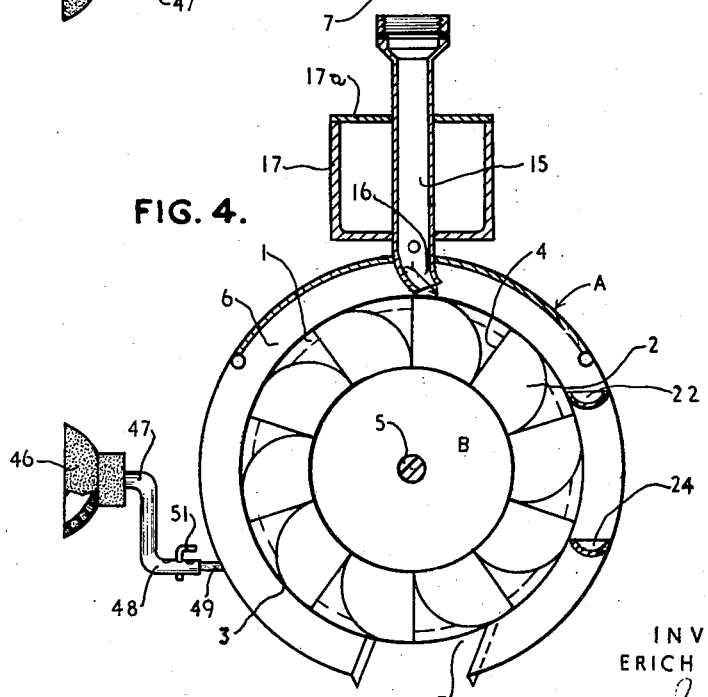
FIGURE 4 is a vertical section through the rotor housing or casing showing the location of the liquid discharge nozzle relatively to the peripheral buckets on the rotor.

A similar form of trough 24 is shown in FIGURE 4 and this trough is located opposite the trough 22, and the trough 24 carries a part of the water from the housing or casing 6 and likewise deliver it into a downward sloping pipe 25 which extends outwardly from the housing or casing and has its discharge end located below the cleaning unit D.

The cleaning unit D consists of an approximately tubular or sleeve-like sponge member 26 and embraces one end of the hollow shaft or pipe 5, and when the tubular member is mounted on the hollow shaft 5 when the outer end of the sponge forms a flange-like portion 27 which is represented as being frusto-conical in longitudinal section, but I do not limit the contour of this sponge to this shape as other configurations may be equally useful if utensils other than tumblers are being washed and cleaned.

Irrespective of the form of the sponge shown, it will be appreciated that it must be shaped to fit the general type of utensils being washed, and in a manner best suited to fulfill the functions required of it.

This sponge may be attached by suitable means such as by sewing to the cleaning member D by thin copper wires as the attaching medium.

The cleaning unit D is porous in the form of a cylindrical sleeve which is mounted on a projecting end of the tubular shaft or pipe 5, and this sleeve is positioned on the shaft by nuts 32, and the outer periphery of the sleeve becomes convex when the sleeve is tightened into position. It will be observed that the nuts 32 about a copper or like washer 32a, and to one of these washers the wires 27a are attached.

The cleaning unit C is in the form of a composite cylindrical brush 33 similar in construction to the cleaning unit D in that bristles are used in combination with a sponge-like material. It is not thought necessary to describe the cleaning unit C in detail as such description would only render the specification prolix.

The cleaning unit C is mounted on the end of the shaft 5 remote from the unit D, and is rotatable with the shaft and this brush C is embrbaced by a splash shield 34 which is provided on its outer end with a radial flange 35 which embraces the peripheral marginal portion of the brush 33. The brush is partially retained within the shield.

From the radial flange 35 of the splash shield supporting rods 37 extend towards the housing or casing 6 where the rods 37 slidably engage the tubes 38 mounted in the housing 6. I preferably use a plurality of rods 37 and tubes 38 which are equidistantly spaced around the splash shield and casing 6.

A spring 39 is located in each tube 38 and engages the end of the co-acting rod 37 so that the splash shield 34 is floating. The end of the brush 33 projects slightly beyond the flange 35 so that a flat dish may be held against the rotating brush, and so cleaned. The brush 33 may be formed of a compressible substance such as sponge rubber, and orifices 40 extend through the brush to insure that the cleaning water and detergent permeates the sponge of the brush.

The core of the brush 33 is held in position on the tubular shaft 5 by means of a plate 41 and a thumb screw 42 is provided to engage the end of the tubular shaft 5 and press the plate 41 into contact with the brush and so hold the brush in position.

At least one bracket 44 is provided to brace the reservoir 17 from the housing 6, and this bracket is formed with an arcuate hand grip 45 which facilitates in the lifting of the dish washer A as a whole into and out of a kitchen sink.

The dish washer A is provided with a plurality of suction cups 46 mounted on a bracket 47 which is formed with a tubular stem 48 to slidably and adjustably engage with the rod 49 secured to and carried by the housing 6. The tubular stem 48 and the rod 49 are provided with registering orifices 50 and when these orifices are brought into registering position then a pin 51 is engaged with the orifices to hold the bracket in the desired position to bring the suction cups into engagement with an adjacent wall of the sink in which the dish washer A is mounted.

I have illustrated only two suction cups 46, but I may use three or more if desired, and in practice it has been found that the use of three cups arranged in triangular formation permits of the washing machine being firmly attached to the wall of a kitchen sink and rigidly hold the washing machine in position.

When my dish washer is in use it is placed in a sink and held at a desired height above the bottom of the sink, and the suction cups 46 are then pressed into engagement with the adjacent wall of the sink and the inlet water pipe 15 is then connected to a faucet of the sink.

When the faucet is open, water under pressure from a water main is delivered through the inlet pipe 15 and discharged into the buckets 2, and the impact of the stream of water, together with the weight of water collected in the buckets, rotates the rotor B in a clockwise direction.

As the water is discharged at the lower end of the rotor it drains off through the opening or port 7. However, part of the water delivered to the buckets 2 spills into the inclined trough 22 located approximately half way up the casing wall and is delivered through the pipe 23 to the rotating brush 33. At the same time soap suds or liquid detergent is delivered from the reservoir 17 through the pipe 20 to the pipe 23 and thence to the brush 33.

It will be noted that the discharge end of the pipe 23 is in close proximity to the brush 33, so that the intimately mixed cleaning water and suds is delivered to the brush 33 to the outer face, and when a plate or dish is brought into contact with the outer face of the brush, then an effective cleaning of the plate or dish takes place.

It will be noted that the spray shield 34 being floating will be displaced slightly towards the rotor when the plate or dish is pressed on the outer face of the brush 33, but when this pressure is removed the spray shield 34 is forced outwardly by the springs 39 into its normal position.

If tumblers or similar articles are to be cleaned, then the valve 19 may be opened to allow droplets or suds to pass through the conduit 21 into the tumbler held below the opposite end of the pipe.

This tumbler may then be placed below the pipe 25 to receive some water therefrom, after which the tumbler is placed over the sleeve 26 which is rotating at a high speed and so the tumbler will be effectively cleaned and may then be rinsed with water from the pipe 25.

As stated above the cleaning units C and D are of similar construction, that is to say they are constructed with bristles in combination with sponge material, and this construction is such that they provide both an abrasive action and a polishing action when cleaning utensils or dishes.

I have described my invention with respect to a dish washing machine, but it can be used for washing storm windows particularly as most basements in homes are provided with drain pipes and faucet facilities.

The machine may also be carried out of doors or into a garage where a faucet is installed and used for washing and cleaning automobiles, and owing to its portable nature the machine may be used for many cleaning purposes provided there is access to a faucet supplied with water under pressure.

The machine is simple in construction but is strong and durable, and will occupy a minimum of space when not in use, and it will simplify many of the drudgeries experienced in households, restaurants and other places, and the device is not only desirable but will fill a long felt want in such establishments.

What is claimed as new is:

1. A hydraulically operated dish washing machine comprising a rotor, a casing enclosing the rotor, an axial shaft secured to said rotor and journalled in said casing, cleansing brushes on opposite ends of said shaft exterior of said casing, inlet and discharge ports in the top and bottom respectively of said casing, an inclined water-collecting trough on the inner peripheral wall of the casing and a conduit from the lower end thereof delivering a stream of water by gravity to one of the brushes, a second similar collector trough in the casing and a conduit therefrom delivering a stream of rinse water by gravity to a point below the second brush.

2. A hydraulically operated dish washing machine as defined in claim 1 having a reservoir for a liquid cleaning agent mounted above the casing, a valve controlled feed line extending from said reservoir to the said first conduit to carry said liquid cleansing agent intermingled with the stream of water to the first of said brushes and a second valve controlled conduit from said reservoir having its discharge end above the second brush.

3. A hydraulic operated dish washing machine as defined in claim 1 wherein the casing is provided with an inverted U-shaped bail formed with a transverse arm and depending arms embracing the casing and the shaft extends through both the casing and depending arms of the bail, a water feed pipe extending through the transverse arm of the bail and through the inlet port in the top of the casing and formed with an offset flattened discharge end disposed tangential to the periphery of the rotor, a bracket adjustably secured to the casing and suction cups on the bracket enabling the machine to be mounted securely on the wall of a sink.

References Cited in the file of this patent

UNITED STATES PATENTS

| | | |
|---|---|---|
| 602,190 | Evans | Apr. 12, 1898 |
| 620,250 | Pira | Feb. 28, 1899 |
| 702,359 | Durston | June 10, 1902 |
| 1,256,002 | Farrar | Feb. 12, 1918 |
| 1,332,033 | Edwards | Feb. 24, 1920 |
| 1,462,598 | Grenzke | July 24, 1923 |
| 1,757,909 | Kazazian | May 6, 1930 |
| 1,876,895 | Fleming | Sept. 13, 1932 |
| 1,951,273 | Dalgleish | Mar. 13, 1934 |
| 2,019,705 | Hubert | Nov. 5, 1935 |

FOREIGN PATENTS

| | | |
|---|---|---|
| 31,292 | Switzerland | June 1, 1904 |
| 292,943 | Canada | Sept. 10, 1929 |
| 952,471 | Germany | Nov. 15, 1956 |
| 300,073 | Great Britain | Nov. 8, 1928 |